(12) United States Patent
Geake

(10) Patent No.: US 11,263,675 B2
(45) Date of Patent: Mar. 1, 2022

(54) BUYER AND SELLER INFORMATION APPLICATION AND METHOD

(71) Applicant: Drive Automation LLC, Chicago, IL (US)

(72) Inventor: Adam Geake, Chicago, IL (US)

(73) Assignee: Drive Automation LLC, Chicago, IL (US)

(*) Notice: Subject to any disclaimer, the term of this patent is extended or adjusted under 35 U.S.C. 154(b) by 257 days.

(21) Appl. No.: 16/583,338

(22) Filed: Sep. 26, 2019

(65) Prior Publication Data

US 2020/0111140 A1 Apr. 9, 2020

Related U.S. Application Data

(60) Provisional application No. 62/740,607, filed on Oct. 3, 2018.

(51) Int. Cl.
*G06Q 30/00* (2012.01)
*G06Q 30/06* (2012.01)
*G06Q 10/10* (2012.01)

(52) U.S. Cl.
CPC ..... *G06Q 30/0609* (2013.01); *G06Q 10/1095* (2013.01)

(58) Field of Classification Search
None
See application file for complete search history.

(56) References Cited

U.S. PATENT DOCUMENTS

| 10,007,941 B1* | 6/2018 | Liu | G06Q 10/0833 |
| 2015/0095214 A1* | 4/2015 | Ahn | G06Q 20/227 705/39 |
| 2016/0078411 A1* | 3/2016 | DiCarlo | G06Q 50/167 705/316 |
| 2017/0169398 A1* | 6/2017 | Washington | G06Q 10/08 |
| 2018/0053227 A1* | 2/2018 | Camhi | G06Q 30/0281 |
| 2019/0080425 A1* | 3/2019 | Bui | G06F 16/9032 |

FOREIGN PATENT DOCUMENTS

| KR | 10-2016-0000899 | 1/2016 |
| WO | 2013034953 | 3/2013 |

OTHER PUBLICATIONS

PCT Written Opinion, Corresponding PCT App. US2019/053349; dated Jan. 13, 2020.

* cited by examiner

*Primary Examiner* — Mila Airapetian
(74) *Attorney, Agent, or Firm* — Adam K. Sacharoff; Much Shelist, PC

(57) ABSTRACT

A method of a buyer and a seller information network sharing service is provided. The method includes providing information from a seller of at least one product to a potential buyer. The buyer is able to request a meeting to inspect the product, either a car, home, or consumer product. The seller upon accepting a meeting request, has an application on a mobile device that will access real-time location data for display on the seller mobile device to provide an estimated time of arrival of the buyer, to the seller location.

17 Claims, 15 Drawing Sheets

US 11,263,675 B2

BUYER AND SELLER INFORMATION APPLICATION AND METHOD

CROSS REFERENCE TO RELATED APPLICATIONS

This invention claims priority to U.S. Provisional Application 62/740,607 filed Oct. 2, 2018, which is hereby incorporated in its entirety by reference.

BACKGROUND OF THE INVENTION

An application system and its method are provided through a platform to enable potential sellers to receive real-time information and location data on a potential buyer. Information can then be shared to provide the seller with information on the buyer prior to arrival, including an estimated time of arrival.

SUMMARY OF THE INVENTION

In a summary of the invention, there is provided in multiple embodiments disclosed herein a method of a buyer and a seller information network sharing service. The method being performed by one or more processors of one or more computing devices. The method includes providing, on a seller application that is stored on a seller mobile device, access to a business server that provides information on at least one product available to purchase. The seller application further displays an accept meeting feature that is operative to the seller of the at least one product. The method further provides, on a buyer application that is stored on a buyer obile device, access to the business server and a selection feature that is operative to display information about the at least one product available to purchase through the seller and at a seller location. The selection feature being responsive to an input of a buyer such that in response to the input of the buyer interested in purchasing the at least one product, the buyer application sends a meeting request to the seller application. The seller application, in response to input of the seller to accept the meeting request, obtains location-specific information based on a real-time buyer location of buyer GPS data obtained from the buyer mobile device and a real-time seller location based on seller GPS data of the seller mobile device. The method further provides, on the seller application, a location feature that is operative to display location information on the seller mobile device, wherein the display location information is a real-time arrival data of the buyer travelling to the seller location.

In another aspect of the invention, there is provided a method of a seller information network sharing service. The method being performed by one or more processors of computing devices and includes providing, on a seller application that is stored on a seller mobile device, access to a business server that provides information on at least one product available to purchase. The seller application further displays an accept meeting feature that is operative to the seller of the at least one product. The information may further include a price and a location of the product, and further providing, on the seller application, a display of an accept meeting feature that is operative to the seller of the at least one product. In response to the input of the seller to accept the meeting request, the seller application obtains location-specific information based on a real-time buyer location of buyer GPS data obtained from the buyer mobile device and a real-time seller location based on seller GPS data of the seller mobile device. In addition, the seller application displays location information on the seller mobile device, and wherein the display location information is a real-time arrival data of the buyer travelling to the location of the product based on the real-time buyer location and the location of the product.

In another embodiment, there is provided a system of a buyer and a seller information network sharing service. The system being performed by one or more processors of computing devices and includes a seller application stored on a seller mobile device and a buyer application stored on a buyer mobile device. The seller application being configured to access a business server stored on a server and accessible through a network connection. The business server stores information on at least one product available to purchase. The seller application being further configured to display an accept meeting feature that is operative to the seller of the at least one product. The buyer application being configured to access the business server and further configured to display a selection feature that is operative to the buyer of the at least one product available to purchase through the seller and at a seller location, and wherein the selection feature is configured to be responsive to an input of a buyer. In response to the input of the buyer to inspect the at least one product, the buyer application is configured to send a meeting request to the seller application. In response to the input of the seller to accept the meeting request, the seller application being configured to obtain location-specific information based on a real-time buyer location of buyer GPS data obtained from the buyer mobile device and a real-time seller location based on seller GPS data of the seller mobile device. The seller application being further configured to display on the seller mobile device the location information, and wherein the display location information is a real-time arrival data of the buyer travelling to the seller location.

Numerous other advantages and features of the invention will become readily apparent from the following detailed description of the invention and the embodiments thereof, from the claims, and from the accompanying drawings.

BRIEF DESCRIPTION OF THE DRAWINGS

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION OF THE INVENTION

Figure 1:
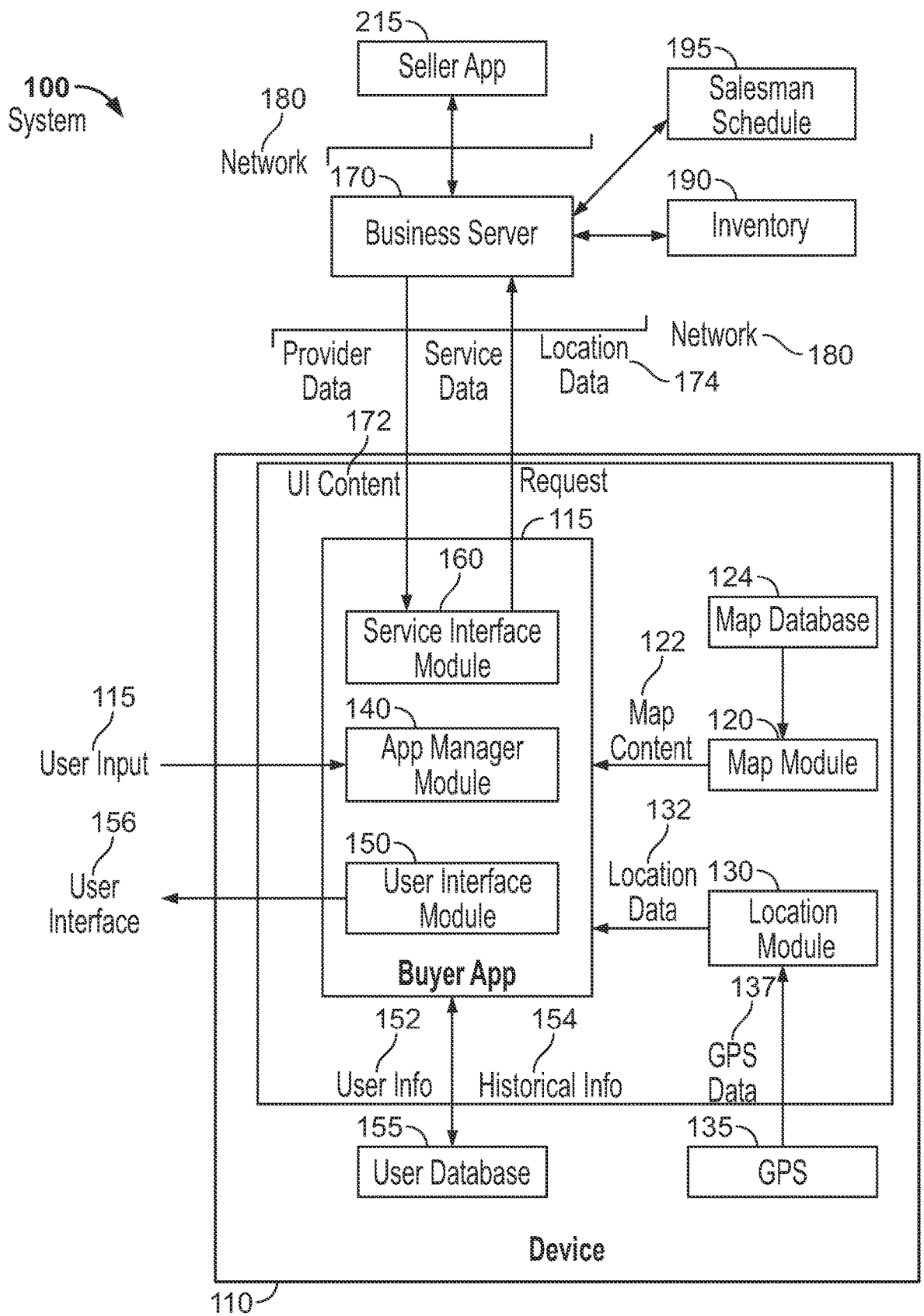
FIGS. 1 and 2 are block system diagrams of embodiments of the present invention.

This invention includes a method, system, and/or apparatus, such as embodied in a software application. As used herein, a user device, a client device, a business professional device, a computing device, and/or a mobile device refer to devices corresponding to desktop computers, cellular devices or smartphones, personal digital assistants (PDAs), laptop computers, tablet devices, etc., that can provide network connectivity and processing resources for communicating with the system over one or more networks. Client devices and business professional devices can each operate a designated service application (e.g., a client application and a business professional application, respectively) that is configured to communicate with the professional service arrangement system.

The method and system of this invention is mobile and positional in nature. Such systems, like many other systems originally developed on one type of computing platform but migrated to another, operate not only on mobile environments. That is, while MPSM implementations are targeted to primarily execute on mobile devices, such as but not limited to smart-phones, tablets, and/or laptops, they often support implementation for non-mobile environments such as but not limited to desktops and workstations, servers, and large scale compute farms and cloud computing servers. The invention will be described below with a mobile device, such as smart phone having cell service, a GPS system, and access to the Internet via WiFi. The method and system of this invention is desirably executed or implemented on and/or through a mobile device computing platform. Such computing platforms generally include a processor, a recordable medium, an input/output (I/O) device, and a network interface capable of connecting either directly or indirectly to the Internet. The mobile device executes over a networked environment. The mobile device is connected, either directly or indirectly, using any of the many techniques and technologies known in the art, over a network, to back-end system or systems, itself/themselves computing devices. The mobile device can connect with a remote server, to store and/or access user or community information.

The system coordinates travel and may provide estimated travel time and ETA for the travel. User devices may interact with the system through client applications configured to interact with the system. The client applications of the user devices can present information received from the system on a user interface, such as a map of the geographic region, the current location of the user device, estimated travel duration, and/or an ETA associated with a service request. The client application executing on the user device may be able to determine the current location and provide the current location to the system. The user devices can communicate with the system via the network, which may comprise any combination of local area and wide area networks employing wired or wireless communication links. In some embodiments, all or some of the communication on the network may be encrypted.

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Depending on implementation, one or more components of the system can be implemented on network side resources, such as on one or more servers. The system can also be implemented through other computer systems in alternative architectures (e.g., peer-to-peer networks, etc.). As an addition or an alternative, some or all of the components of the system can be implemented on client devices, such as through applications that operate on the client devices and/or the business professional devices. For example, a client service application that runs on the respective client device and/or a business professional service application can execute to perform one or more of the processes described by the various components of the system. The system can communicate over a network, via a network interface (e.g., wirelessly or using a wireline), to communicate with the one or more client devices and the one or more business professional devices.

The system can communicate, over one or more networks, with client devices and business professional devices using a client device interface and a device interface, respectively. The device interfaces can each manage communications between the system and the respective computing devices. The client devices and the business professional devices can individually operate client service applications and business professional service applications, respectively, that can interface with the device interfaces to communicate with the system. According to some examples, these applications can include or use an application programming interface (API), such as an externally facing API, to communicate data with the device interfaces. The externally facing API can provide access to the system via secure access channels over the network through any number of methods, such as web-based forms, programmatic access via RESTful APIs, Simple Object Access Protocol (SOAP), remote procedure call (RPC), scripting access, etc.

FIG. 1 illustrates a system configurable for use by a business to track a customer or potential buyer in coming to its location. As seen throughout various industries the ability to track the delivery to a customer is well known, whether it is a ride service, food delivery, or parcel delivery. The customer gaining access through a mobile application can see in real time the drive time of when the driver or delivery will arrive. However, the reverse of this aspect is not known or provided. The ability to track a customer or potential buyer to the business or potential seller of a product coming to a business location for an appointment or pickup does not currently exist. The need for this reverse tracking is extremely important in various industries. Knowing when a customer is coming to test drive a car, pick up a parcel, or arrive at a set meeting helps the business track and set aside its employees time and assets.

Figure 2:
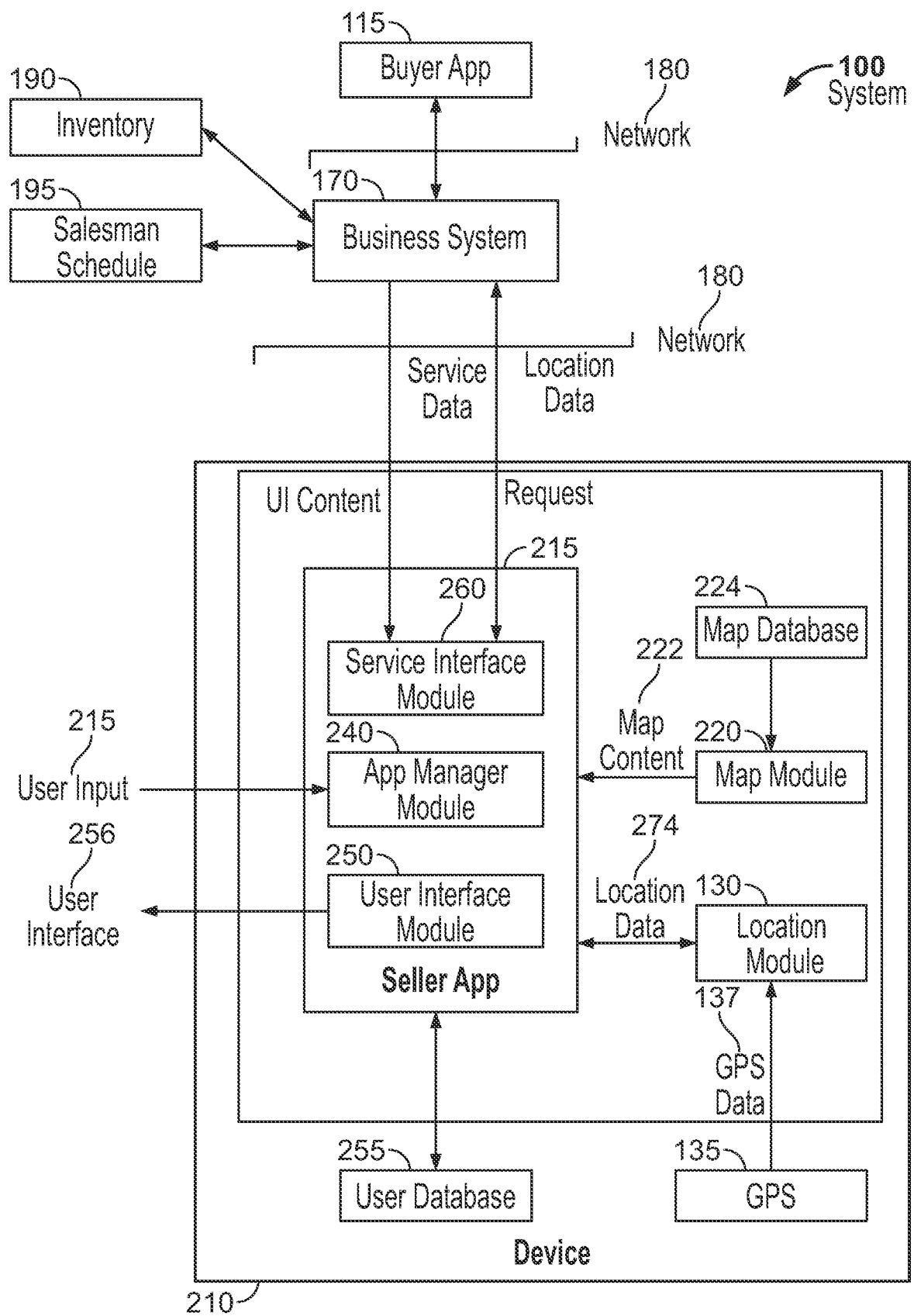
Figure 3:
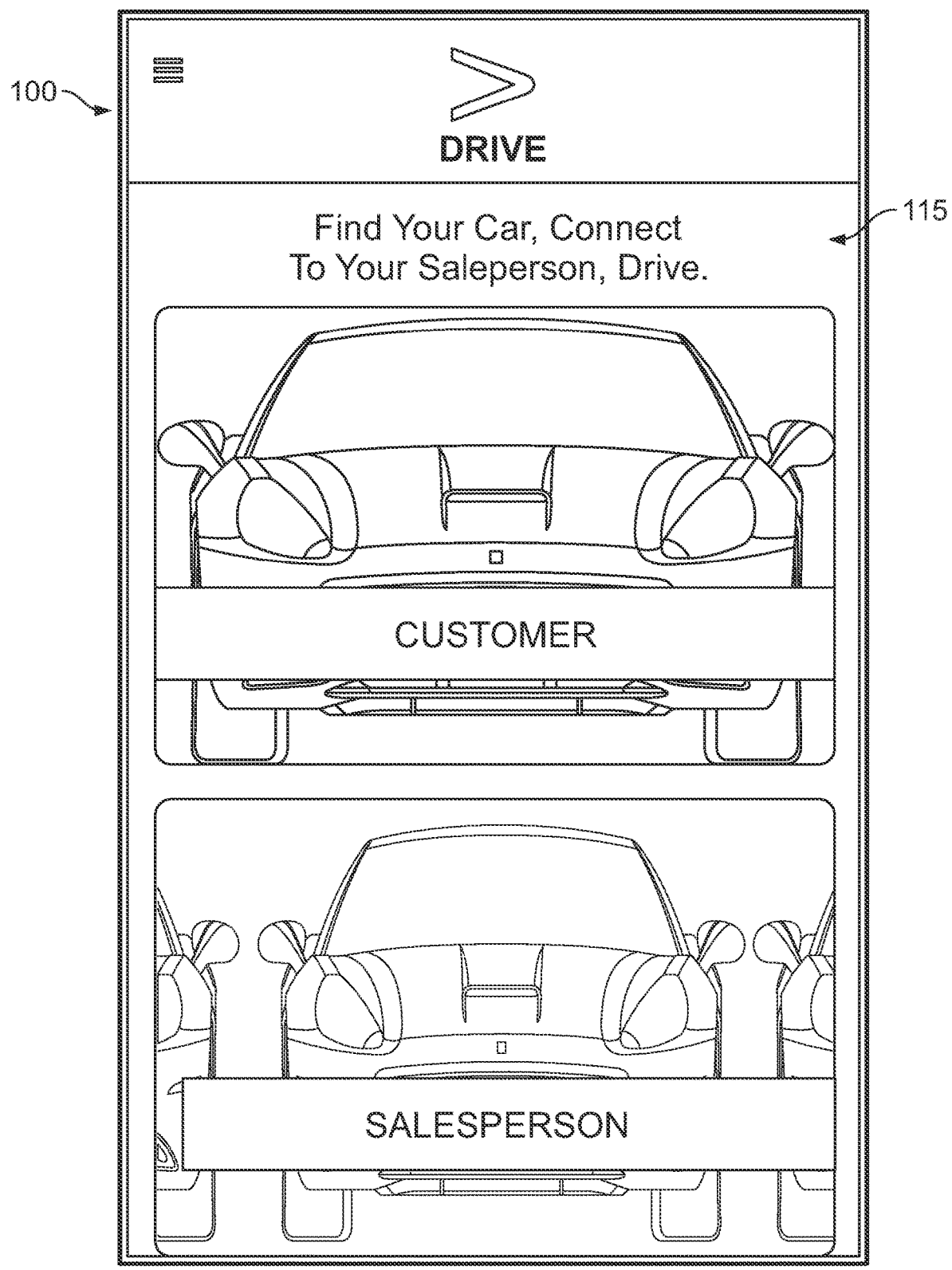
FIGS. 3-11 are provided to illustrate embodiments of the present invention, incorporating the invention in the car dealership industry.
Figure 4:
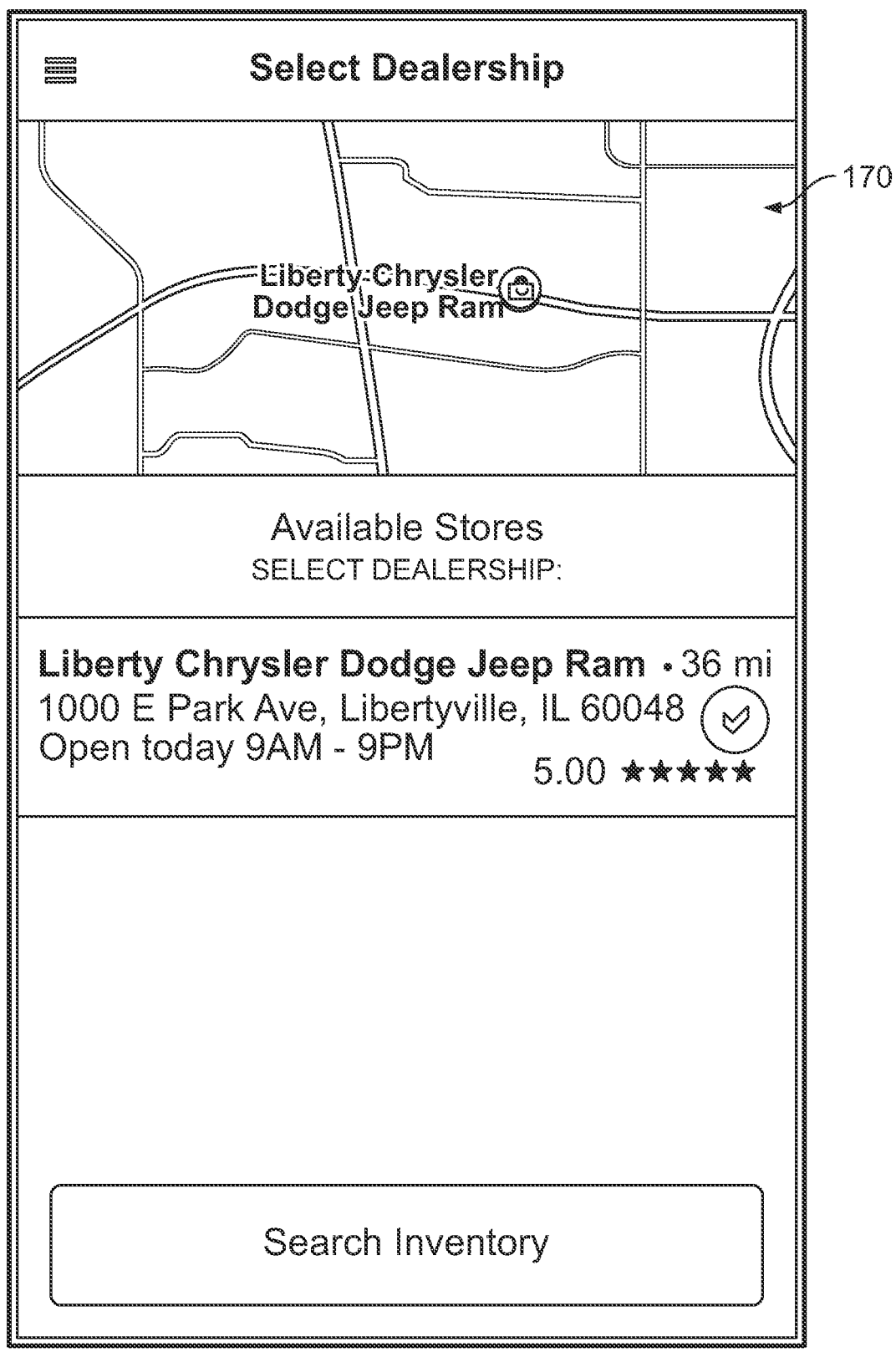
Figure 5:
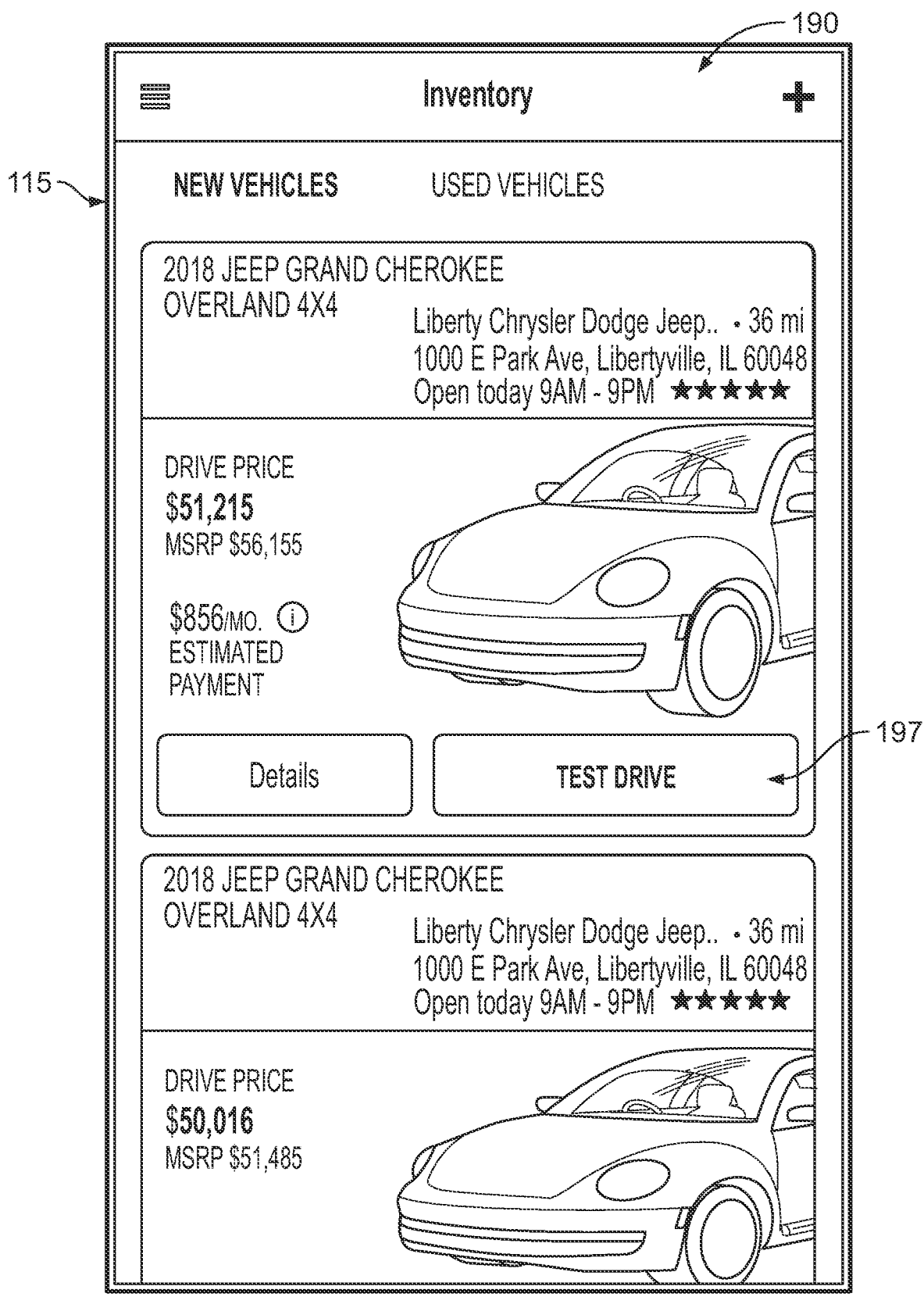
Figure 6:
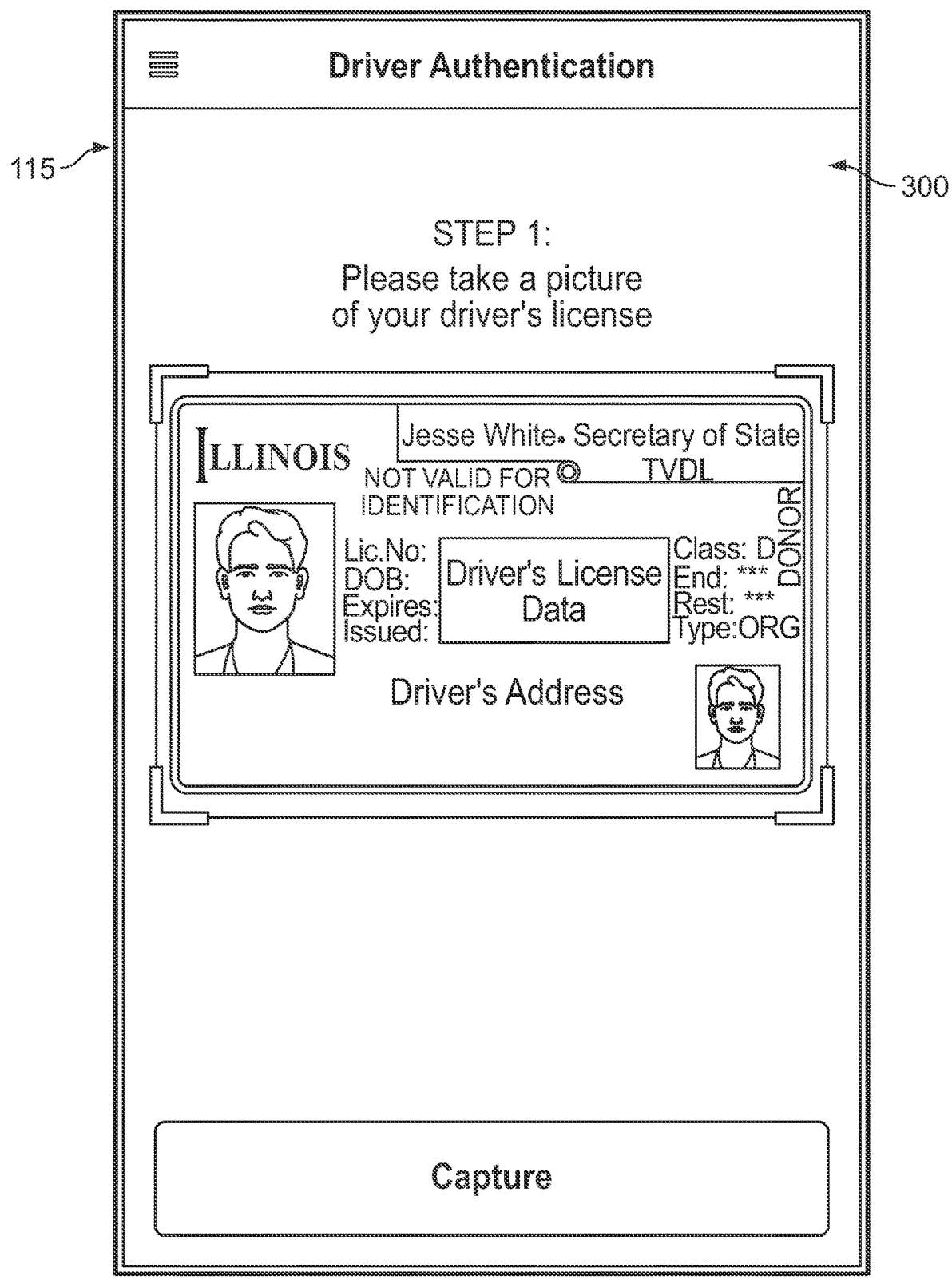
Figure 7:
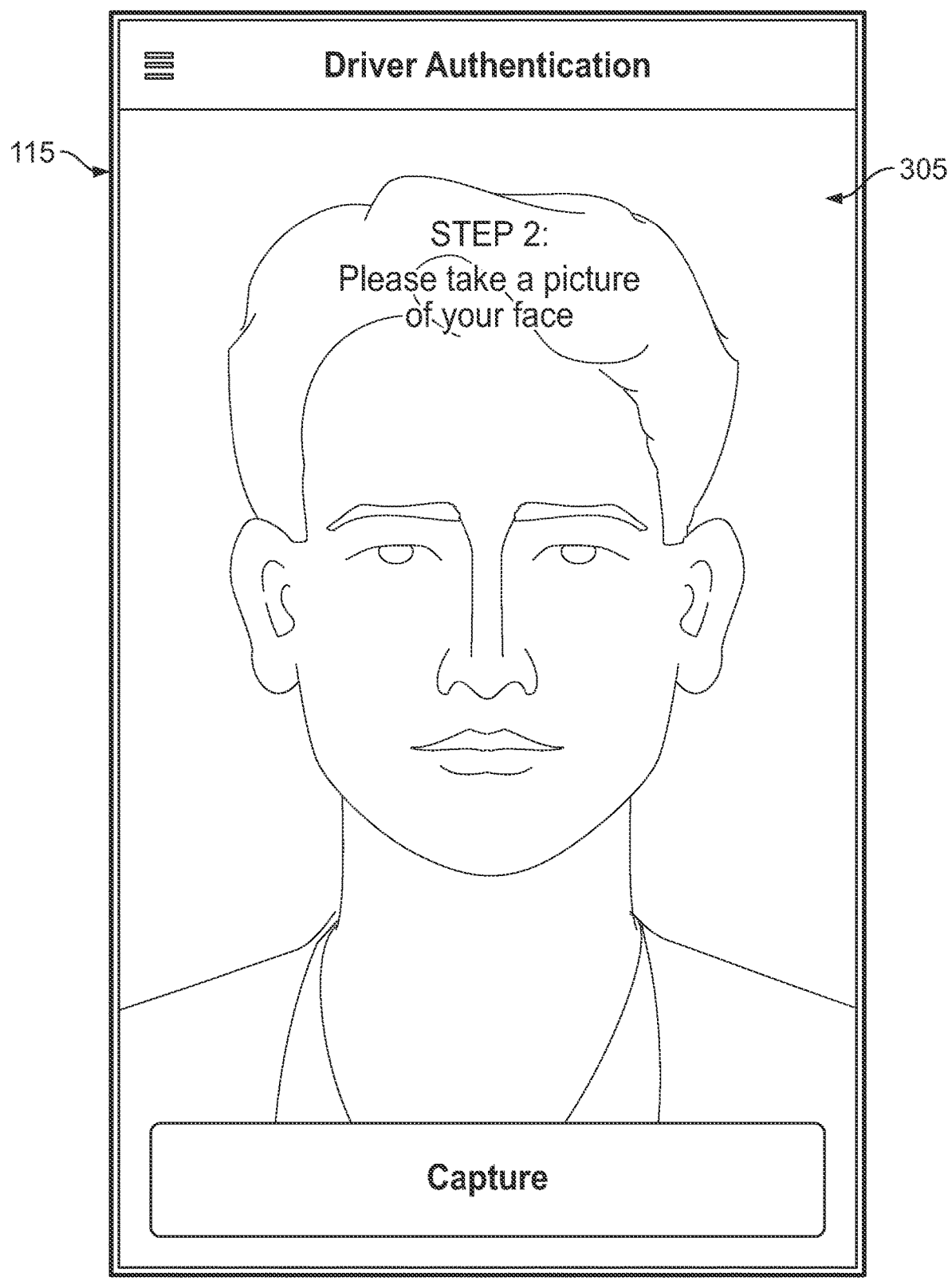
Figure 8:
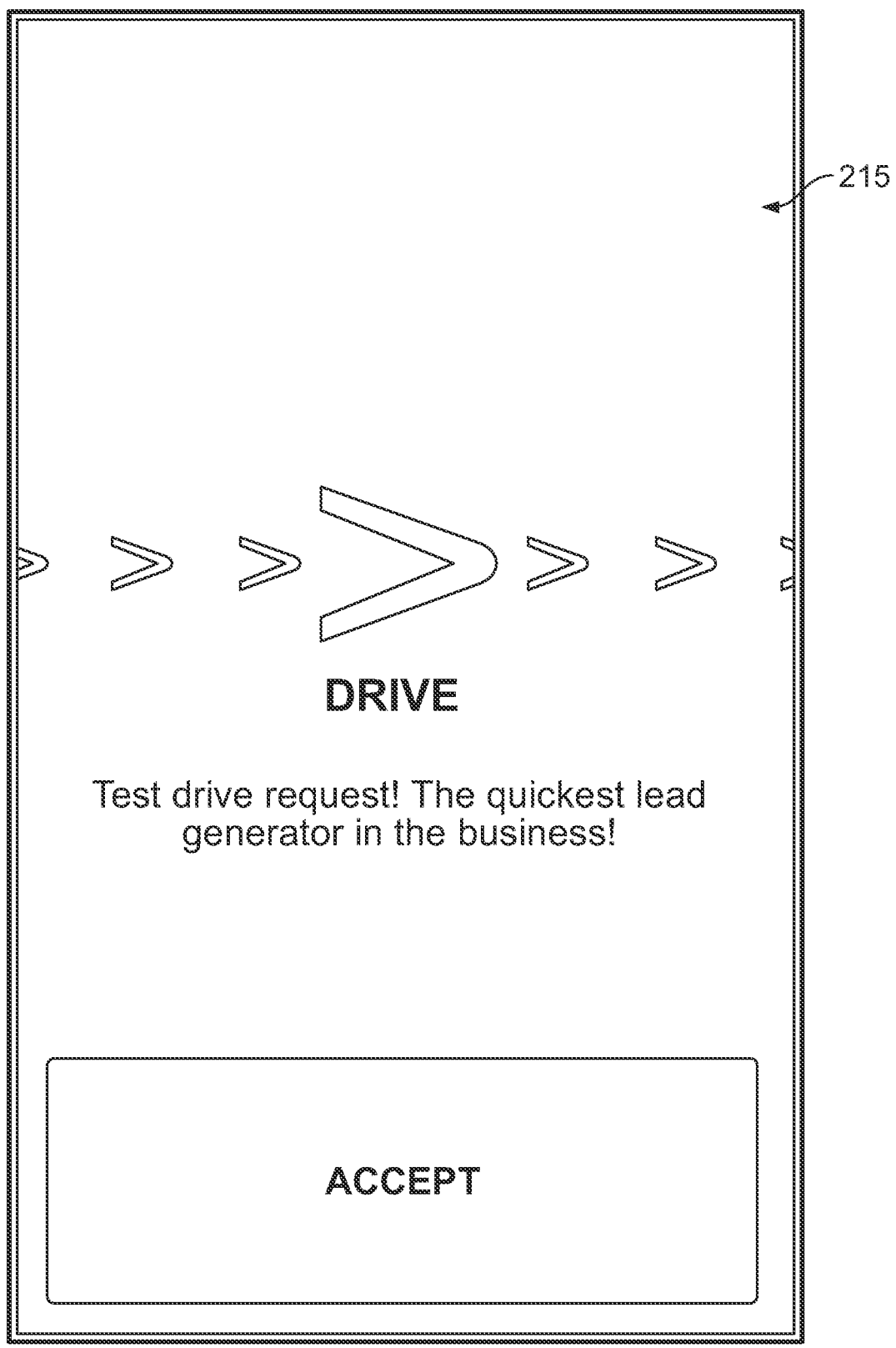
Figure 9:
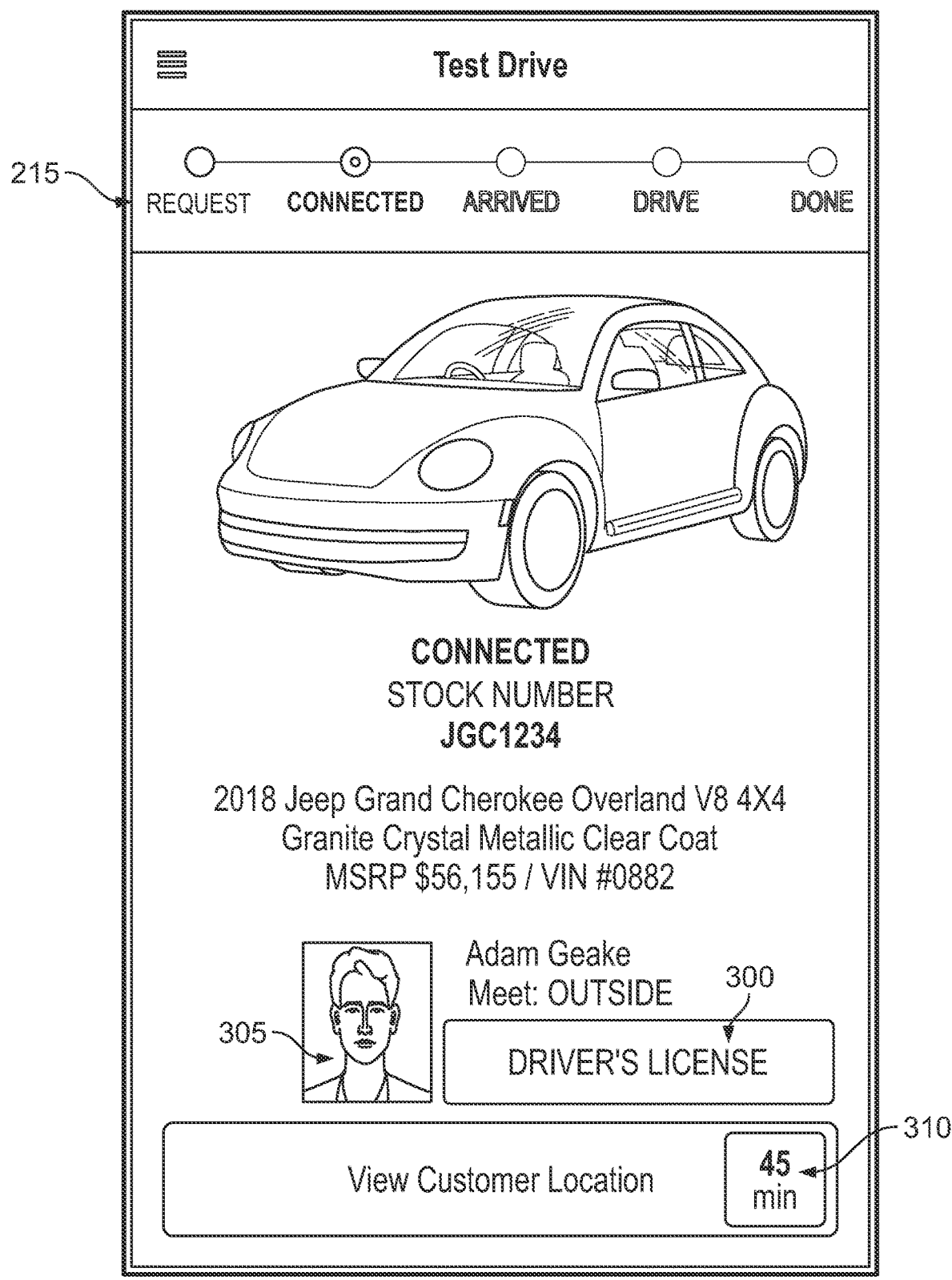
Figure 10:
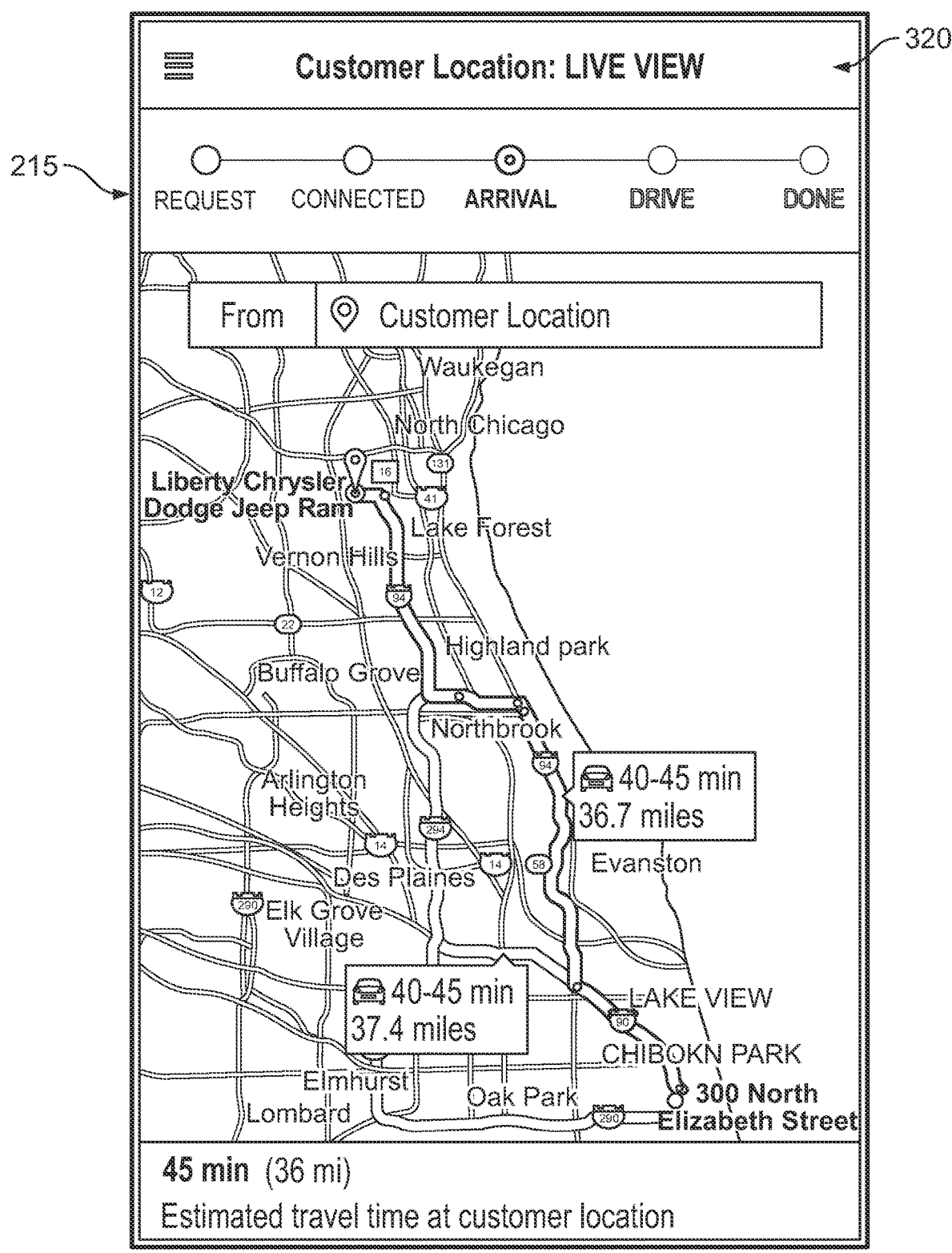
Figure 11:
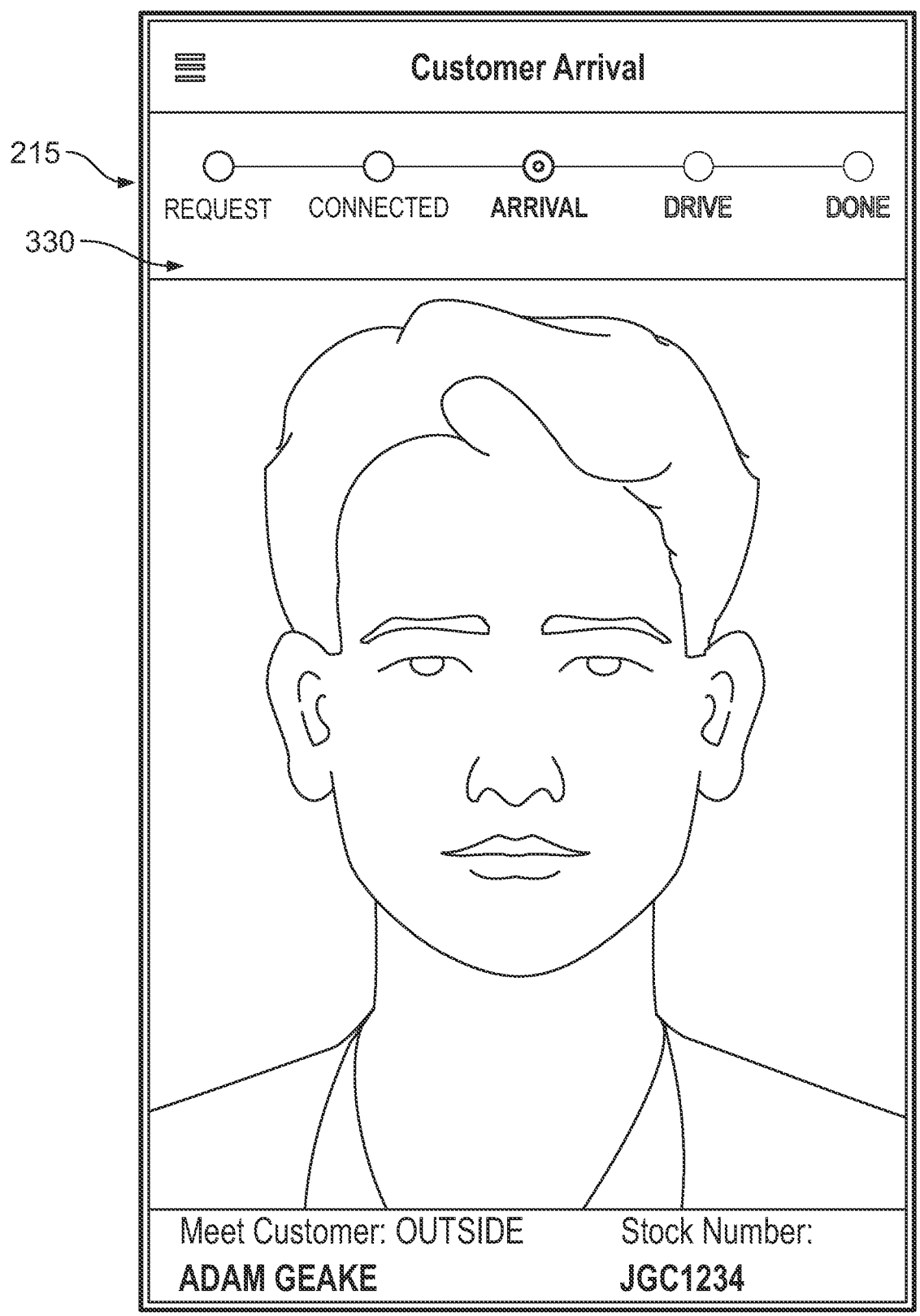
Figure 12:
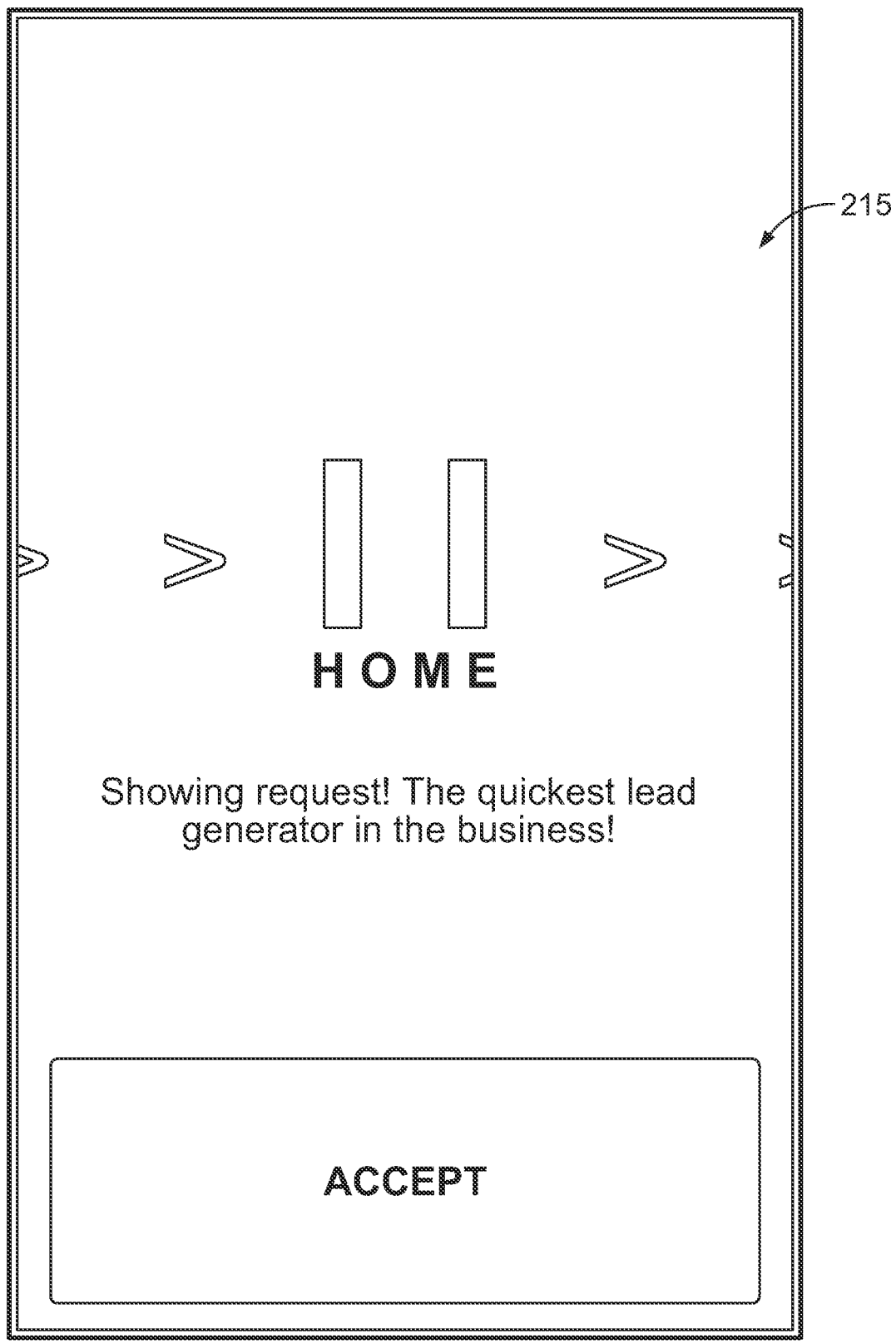
FIGS. 12-15 are provided to illustrate embodiments of the present invention, incorporating the invention in the real-estate industry.
Figure 13:
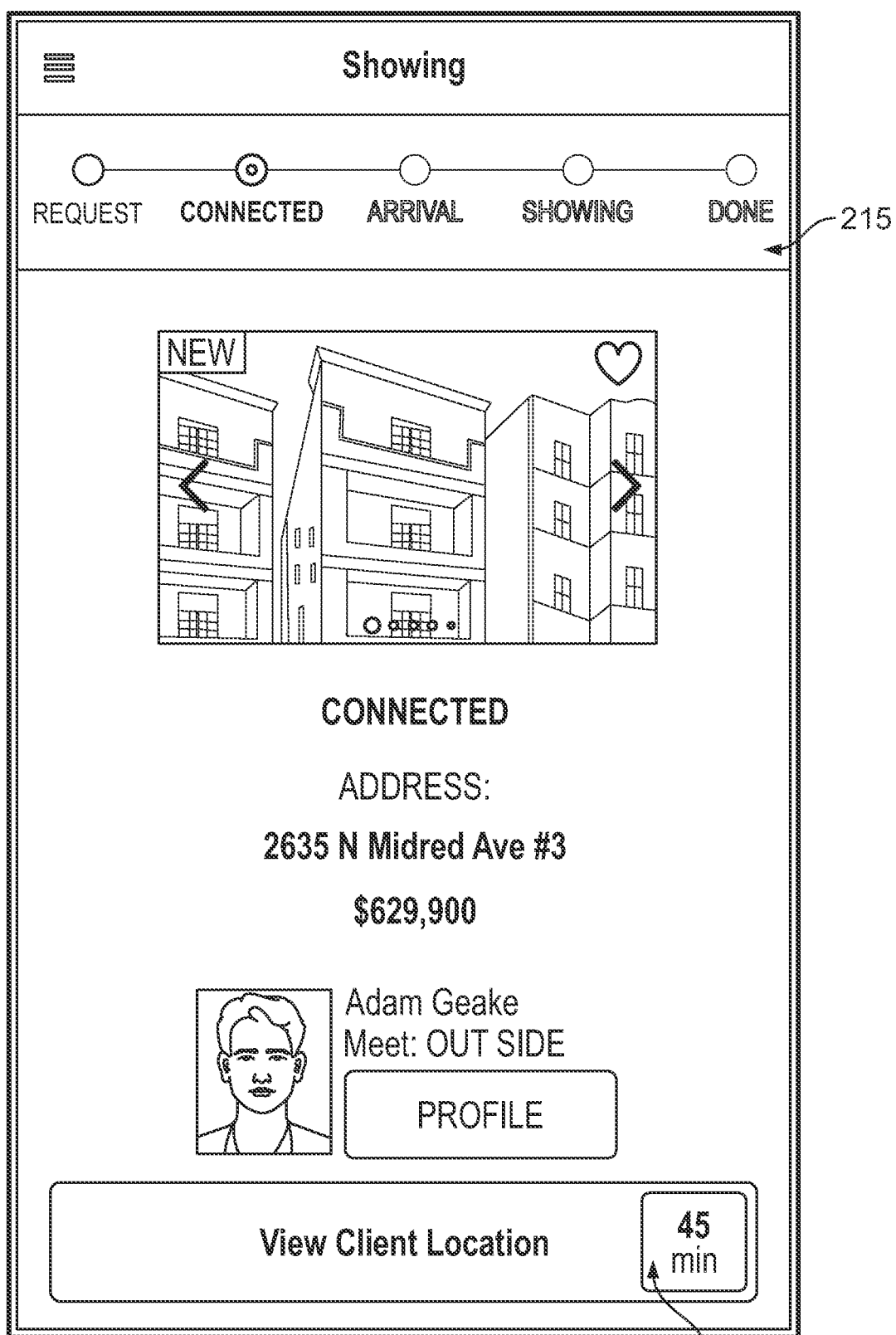
Figure 14:
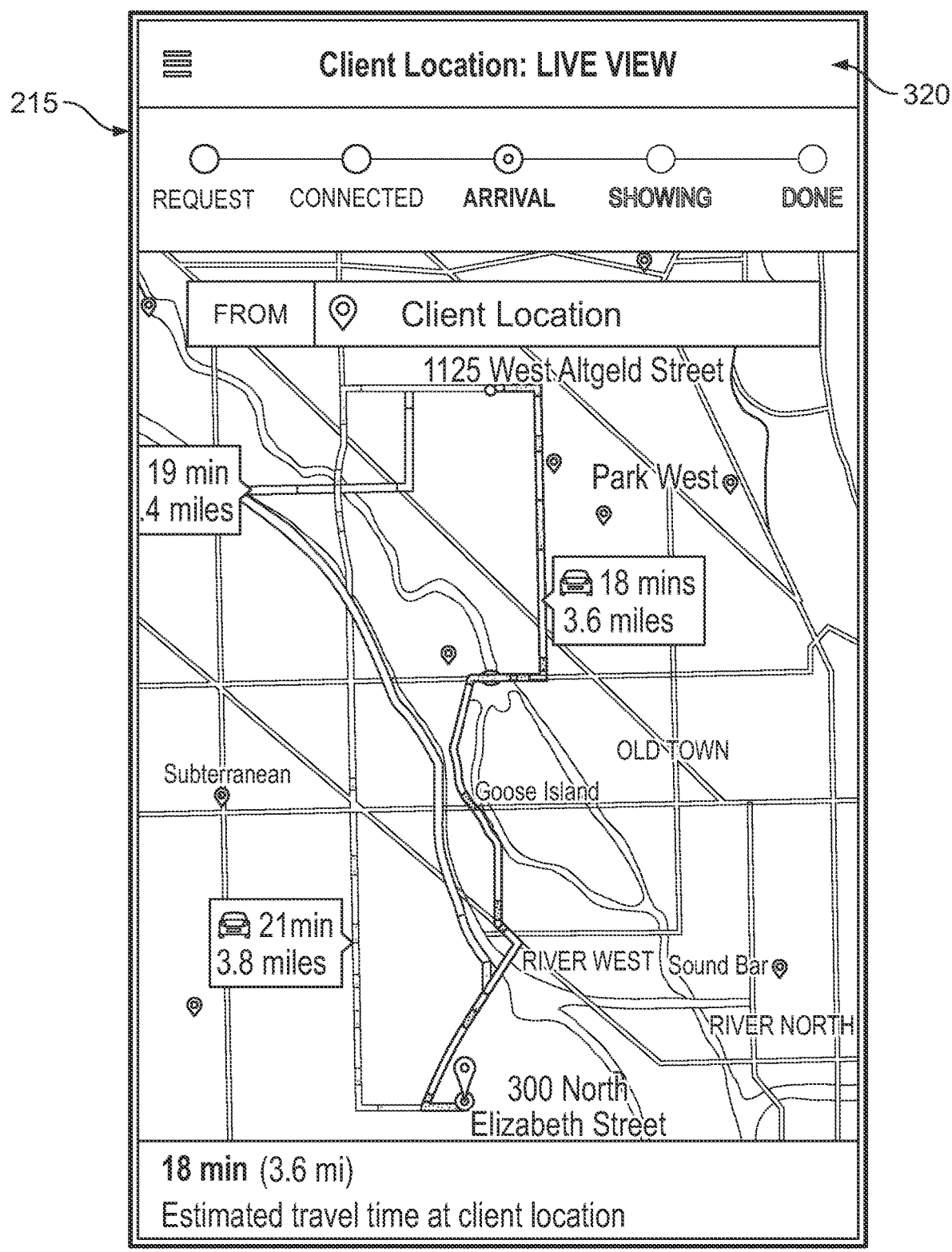
Figure 15:
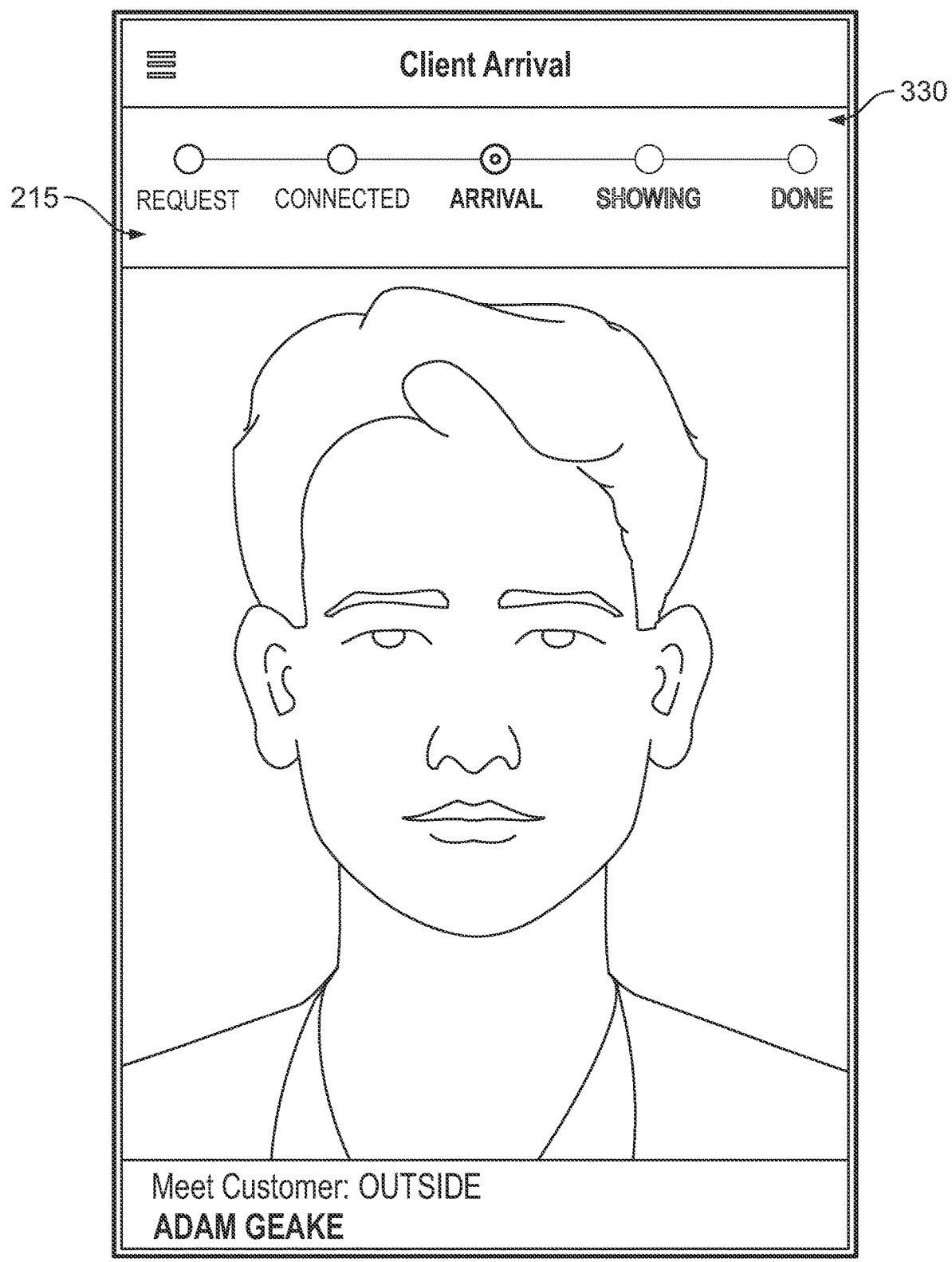

Referring to FIGS. 1 and 2 and in accordance with one or more embodiments there is provided a Customer Tracking System 100, implemented through software that operates on portable computing devices, namely, a potential buyer's mobile computing device 110 (referred to herein as "buyer mobile device 110") and a potential seller's mobile computing device 210 (referred to here as "seller mobile device 210"). System 100 can be configured to communicate with one or more network services, Additionally, the mobile devices can include inherent or native functionality and can utilize third-party services which enable further functionality through system 100.

The system 100 includes a Customer Side Application 115 which interfaces with a map module 120 and a location module 130. The modules of system 100 combine to provide consumer/business interface features that are specific to businesses or industries, and/or real-time conditions. The Potential Buyer Side Application 115 (Buyer App 115) can correspond to a program that is downloaded onto the buyer mobile device 110, such as a smartphone, portable computer device (e.g., tablet or another ego-aware device) or smart car. While similarly, the Potential Seller Side Application 215 (Seller App 215) is downloaded onto the seller mobile device 210. In one implementation, once downloaded and install the buyer and seller will register the devices 110 and 210 with a Business Server 170, over a network 180 to ensure when connected communication and data is shared properly between the devices.

The Buyer App 115/Seller App 215 can include various modules or software programming that run various programs and allows for the proper integration of these programs into the applications. Looking first at the Buyer App 115, it may include an application manager module 140, a user interface (UI) module 150, and a service interface module 160. The service interface module 160 can be used to handle communications exchanged between the Buyer App 115 and the Business System 170 (e.g., over a network 180). For example, the service interface module 160 can use one or more network resources of the buyer mobile device 110 for exchanging communications over a wireless network. The network resources can include, for example, a cellular data/voice interface to enable the device to receive and send network communications over a cellular transport. As an alternative or variation, the network resources can include a wireless network interface for connecting to access points (e.g., Wireless Fidelity 802.11(g) or 802.11(n)) or for using other types of wireless mediums (e.g., WiMax).

The application manager module 140 can receive user input 115, location information data 132, and other information (such as user information 152 and/or historical information 154) to configure content that is to be provided by the UI module 150. For example, the UI module 150 may cause various user interface features 156 to be output to a display of the mobile device 110. Some of the user interface features 156 can be business-specific to display information that is particular to the business the potential buyer is interfacing with at the time of access. For example, when interacting with a general on-line merchandise store or reseller store, real-time inventory resources and calendar scheduling information to set a meeting would be available; similarly, if interacting with a car dealership, inventory, test-drive hours, and salesmen hours may be available; finally, if interacting with a realty business, inventory and open-house hours may be available. Further detail on these are provided below.

Continuing to refer to FIGS. 1 and 2, the user interface features 156 can also provide dynamically adjusted content based on user selections provided via the user input 115. The UI module 150 can also configure the UI framework with location data 132 and map content 122. In this manner, a map in which the user is currently located in can be displayed as part of a user interface feature 156. In some examples, the map module 120 can provide the map content 122 using map data stored in one or more map databases 124. Based on the locale of the user and the user selection(s) made, the application manager module 140 can cause user-selection-specific UI content 172 to be presented with or as part of a user interface 156.

When the Buyer App 115 is operated by the potential buyer, the various user interfaces 156 can be rendered to the user based on the user inputs 115 and/or information received from the Business System 170. The UI module 150 can cause a home page user interface 156 to be displayed that identifies the products that the potential buyer can select using the Buyer App 115. The home page user interface 156 can also provide only certain product selection options or types that are available to the potential buyer. In this manner, based on the current location of the computing device, the Buyer App 115 can cause location-specific user interfaces 156 and content to be presented to the potential buyer.

In many instances, only certain services or products may be available to the potential buyer based on the business selected (e.g., the specific dealership only has a particular vehicle available for test driving, or certain particular meeting times that are open with a manager or salesmen).

The location data 132 can determine the location of the buyer mobile device 110 in different ways. In one example, the location data 132 can receive global positioning system (GPS) data 137 from location-based/geo-aware resources 135 of the mobile device 110. In addition, the location data 132 can also receive GPS data 137 from other applications or programs that operate on the mobile device 180. For example, system 100 can communicate with one or more other applications using one or more application program interfaces (APIs). The Buyer App 115 can use the location data 132 to cause the UI module 150 to configure the UI framework based on the location data 132. In addition, Buyer App 115 provides the user's location data 174 to the Business System 170, so the Business System can specifically track the arrival time of the potential buyer to the business location. For example, the Business Service System 170 is able to monitor the drive time of the potential buyer coming to the business location along with estimated arrival time to determine when the potential buyer will arrive in order to ensure a business employee or seller is available to meet the potential buyer.

In another variation, the Buyer App 115 can retrieve and use user information 152 and/or historical information 154 that are stored in a user database 155. The user database 155 can include records of the user's previous requests as well as user preferences. In some implementations, the user database 155 can be stored remotely at the Business System 170 and user information can be retrieved from h Business System 170. The Buyer App 115 can use the data stored in the user database 155 to identify business locations selected previously by the user (e.g., a local dealership that is closer to the user's home or current location).

Once the user makes a selection by providing a user input 115, the application manager module 140 can cause the UI module 150 to provide user interface features 156 that are based on the selected options. The user can then make a request to the business through the Business System 170 to arrange a specific time to meet at the business location. In one example, when the potential buyer makes a request, a confirmation user interface feature 156 can be provided by the Buyer App 115. From this user interface feature, the potential buyer can view the details of the request, such as the time and place of the meeting, as well as specific information about the potential product, such as in the example of a car dealership, the vehicle the potential buyer is interested in and whether it is available or selected for the test drive. As an alternative, the request can be automatically confirmed as well as user information shared with the business, such as driver's license and insurance information. This can be done by utilizing the camera module on the buyer mobile device 110. After the user confirms the request, the Buyer App 115 can provide the request to the Business System 170 via the service interface 125.

The request includes the business location, type of vehicle selected by the user for test driving, and estimated time of arrival based on the appointment time and location information, which is constantly updated to the Business System.

From the Seller App 215 viewpoint, similar modules would be utilized to provide the potential seller or business with relevant information. Relevant data, such as an inventory database 190 and salesman schedule database or calendar 195 can be shared with the Business System 170 for access by both the Buyer App 115 and Seller App 215. The Seller App 215 will receive location data 174 from the Buyer App 115 and use its own location data 274, which in combination can be used by the Map Module 220 and GPS 135 modules to create an user interface 256 showing the estimated arrival time of the potential buyer to the seller or business location.

In another example, privacy is a major factor today and providing an unknown individual (i.e. the potential seller) with full location data may not be desired as it may provide the potential seller with the buyer's home or business location. As such, the Seller App or Buyer App may mask the starting point of the GPS location. The seller user interface 256 which creates a map with an estimated arrival time may only log the travel location when the potential buyer is within a specific time frame or specific distance to the seller's GPS location. For example, if the current time is 12:00 PM and the estimated arrival time is set for 4:00 PM, the GPS location may only start to display on the seller mobile device 210 when the potential buyer is within 5 miles of the seller's GPS location; or when the potential buyer is 30 minutes away. In addition, GPS modules 135 also factor current traffic in estimated time of arrivals. As such, the potential seller can immediately be aware of the estimated time of arrival as it updates from movement of the potential buyer and/or traffic conditions.

Referring now to FIG. 3-11 there is provided in one example a Customer Tracking System 100 configured for the automotive industry. In this example, the potential buyer having the Buyer App 115 installed and loaded on the buyer mobile device 110 will gain access to an automotive dealership inventory 190 to search. This allows the potential buyer to select a vehicle they are interested in for a purchase, lease, rent, etc. The potential buyer can also select a dealership through the business server 170 based on various factors such as distance to the buyer mobile device 110, favorite preferences or past purchases. When a vehicle is selected, the potential buyer will be able to request an on-demand test drive 197 through the peer-to-peer (P2P) connectivity between the Buyer App 115 and the Business System 170 through the Seller App 215. The Business System 170 would be installed at the dealership either on business computers or a salesmen's mobile phone via an Seller App 215.

After the vehicle is selected and a test drive is requested, the P2P connection is initiated by the customer and accepted by salesperson. GPS services built into the applications informs the salesperson of the customer's location with real-time mapping, as well as push notifications, as the customer travels to the dealership, including estimated arrival time. The software will allow the salespeople to be more efficient with their time and better prepared for customer arrivals.

The application may also be configurable to store and share the customer's driver's license and selfie image with the salesperson after the P2P connection is made. The application may also store and share salesperson information and selfie image to the customer after the P2P connection is made. The Buyer App 115 may also request a driver authentication, which may include a photo of the potential buyer's driver's license 300 and photo identification 305. The potential seller or salesman has the Seller App 215 installed on its seller mobile device 210. The salesman though the user interface 256 is able to accept the request to meet the potential buyer. At that time, information about the potential buyer can be accessed such as the photo identification and driver's license, as well as information on the product the potential buyer is interested in test driving or purchasing. This provides the salesman with ample time to ensure the product is ready for the potential buyer; reducing the time wasted by either party. For example, the potential buyer knowns the product is located at the dealership and the seller knowns which product should be ready for viewing and test driving before the buyer arrives.

The potential seller, as noted above, is also able to view the customer or potential buyer's arrival time 310. The option may or may not be available to actually view the potential buyer's location, which as noted above may or may not be masked. In some circumstances, a live view 320 of the estimated driving of the potential buyer can be provided to the Buyer App 115. In addition, a notification 330 can be provided to the potential seller that the potential buyer has arrived.

Referring now to FIGS. 12-15, Customer Tracking System 100 may be employed into another industry such as realty services, that typically require an on-demand inspection. A potential buyer accessing the Buyer App 115 can review inventory and select a property for an inspection. The inspection time could be provided to the buyer or the buyer may be able to select a time from a calendar to meet with the seller. The Seller App 215 may be given the option to accept an inspection request. The seller would be provided information selected by the buyer, such as the property and buyer identification.

The potential seller, as noted above, is also able to view the customer or potential buyer's arrival time 310. The option may or may not be available to actually view the potential buyer's location, which as noted above may or may not be masked. In some circumstances, a live view 320 of the estimated driving of the potential buyer can be provided to the Buyer App 115. In addition, a notification 330 can be provided to the potential seller that the potential buyer has arrived.

This aspect could cover, not only the sale of properties but also rentals, leases, purchases, and any consumer products such as houses, apartments, business properties, boats, second hand or used products that are offered for sale by a consumer, such as a home-owner's furniture, or any product that may require an inspection at a business or seller's home.

In general, after goods or services are selected and interaction is requested, the P2P connection is initiated by buyer and accepted by seller. Geolocation services built into the app informs seller of buyer location with real-time mapping, as well as push notifications, as buyer travels to seller's location, including arrival. The proprietary software will allow sellers to be more efficient with their time and better prepared for buyer arrivals. The app will store and share buyer's information and selfie image with the seller after the P2P connection is made. The app will store and share seller information and selfie image with buyer after the P2P connection is made. The app will store buyer's payment information, as well as store seller's banking information, allowing for direct payments after the P2P connection is made.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

I claim:

1. A method of a buyer and a seller information network sharing service, the method being performed by one or more processors of computing devices and comprising:
providing, on a seller application stored on a seller mobile device, access to a business server to provide information on at least one product available to purchase, and further providing on the seller application a display of an accept meeting feature that is operative to the seller of the at least one product;
providing, on a buyer application stored on a buyer mobile device, access to the business server and a selection feature that is operative to display information, accessible through the business server, about the at least one product available to purchase through the seller and at a seller location, the selection feature being responsive to an input of a buyer;
in response to the input of the buyer interested in purchasing the at least one product, sending a meeting request from the buyer application to the seller application;
in response to the input of the seller to accept the meeting request, obtaining location-specific information based on a real-time buyer location of buyer GPS data obtained from the buyer mobile device and a real-time seller location based on seller GPS data of the seller mobile device; and
providing, on the seller application, a location feature that is operative to display location information on the seller mobile device, wherein the display location information is a real-time arrival data of the buyer travelling to the seller location, and wherein the real-time arrival data is hidden from the seller application until the location of the buyer is within a predetermined distance to the seller location or within a predetermined time of an established calendar meeting.

2. The method of claim 1, wherein the display location information further provides map data for a visual display of a map showing real-time travel information of the buyer travelling to the seller location.

3. The method of claim 1, wherein the information provided to the business services by the seller includes information on a location of the seller.

4. The method of claim 1, wherein the seller is a car dealer and the input of the buyer is a request to test drive a car.

5. The method of claim 1, wherein the seller is a realtor and the input of the buyer is a request to inspect a home.

6. The method of claim 1, wherein the seller is selling a product from a seller location and the input of the buyer is to inspect the product.

7. A method of a seller information network sharing service, the method being performed by one or more processors of computing devices and comprising:
providing, on a seller application stored on a seller mobile device, access to a business server to provide information on at least one product being offered for sale by the seller, and wherein the information further includes a price and a location of the product, and further providing, on the seller application, a display of an accept meeting feature that is operative to the seller of the at least one product;
providing, on the seller application the accept meeting feature in response from a notification from a potential buyer in seeking to purchase the at least one product;
in response to the input of the seller to accept the meeting request, obtaining location-specific information based on a real-time buyer location of buyer GPS data obtained from the buyer mobile device and a real-time seller location based on seller GPS data of the seller mobile device; and
providing, on the seller application, a location feature that is operative to display location information on the seller mobile device, and wherein the display location information is a real-time arrival data of the buyer travelling to the location of the product based on the real-time buyer location and the location of the product, and wherein the real-time arrival data is hidden from the seller application until the location of the buyer is within a predetermined distance to the seller location or within a predetermined time of an established calendar meeting.

8. The method of claim 7, wherein the display location information further provides map data for a visual display of a map showing real-time travel information of the buyer travelling to the location of the product.

9. The method of claim 8, wherein the seller is a car dealer and the input of the buyer is a request to test drive a car.

10. The method of claim 8, wherein the seller is a realtor and the input of the buyer is a request to inspect a home.

11. The method of claim 8, wherein the seller is selling a product from a seller location and the input of the buyer is to inspect the product.

12. A system of a buyer and a seller information network sharing service, the system being performed by one or more processors of computing devices and comprising:
- a seller application stored on a seller mobile device, the seller application configured to access a business server stored on a server and accessible through a network connection, and wherein the business server stores information on at least one product available to purchase, the seller application configured to display an accept meeting feature that is operative to the seller of the at least one product;
- a buyer application stored on a buyer mobile device, the buyer application configured to access the business server, the buyer application configured to display a selection feature that is operative to the buyer of the at least one product available to purchase through the seller and at a seller location, and wherein the selection feature configured to be responsive to an input of a buyer;
- in response to the input of the buyer to inspect the at least one product, the buyer application is configured to send a meeting request to the seller application;
- in response to the input of the seller to accept the meeting request, the seller application configured to obtain location-specific information based on a real-time buyer location of buyer GPS data obtained from the buyer mobile device and a real-time seller location based on seller GPS data of the seller mobile device; and
- the seller application configured to display on the seller mobile device the location information, and wherein the display location information is a real-time arrival data of the buyer travelling to the seller location, and wherein the real-time arrival data is hidden from the seller application until the location of the buyer is within a predetermined distance to the seller location or within a predetermined time of an established calendar meeting.

13. The system of claim 12, wherein the display location information further provides map data for a visual display of a map showing real-time travel information of the buyer travelling to the seller location.

14. The system of claim 13, wherein the information provided to the business services by the seller includes information on a location of the seller.

15. The system of claim 13, wherein the seller is a car dealer and the input of the buyer is a request to test drive a car.

16. The system of claim 13, wherein the seller is a realtor and the input of the buyer is a request to inspect a home.

17. The system of claim 13, wherein the seller is selling a product from a seller location and the input of the buyer is to inspect the product.

* * * * *